April 29, 1952  L. R. EDWARDS  2,595,130
TRAP FOR RATS, MICE AND THE LIKE
Filed May 2, 1950
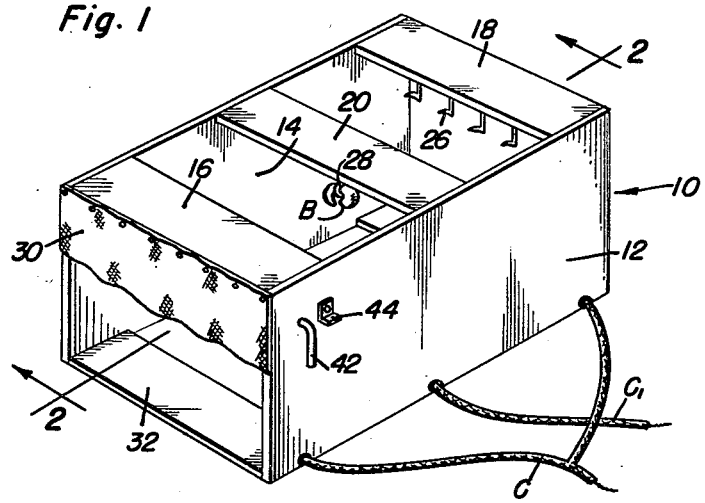
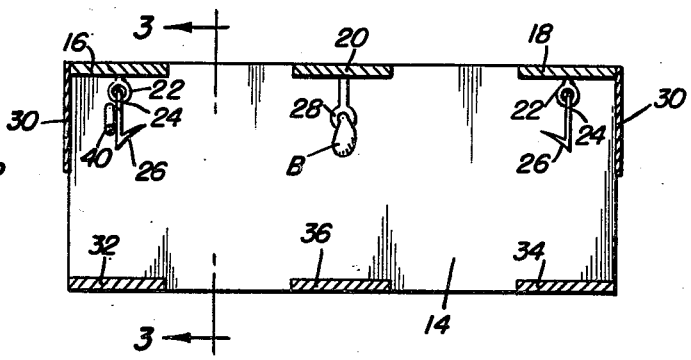
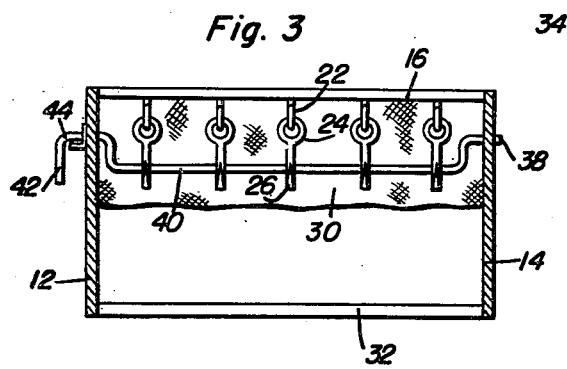
Leslie R. Edwards
*INVENTOR.*

Patented Apr. 29, 1952

2,595,130

UNITED STATES PATENT OFFICE 2,595,130

TRAP FOR RATS, MICE, AND THE LIKE

Leslie R. Edwards, Gurdon, Ark.

Application May 2, 1950, Serial No. 159,594

1 Claim. (Cl. 43—98)

This invention relates to new and useful improvements in traps and the primary object of the present invention is to provide a trap including a pair of conductive strips whereby an animal simultaneously contacting both of said strips will receive a shock, and hooks located sufficiently close to the strips to impale an animal receiving a shock by contacting both strips.

Another important object of the present invention is to provide a trap having rat impaling hooks positioned close to conductive plates so that a rat receiving a shock by contacting the plates will be engaged by at least one of the hooks together with means for retaining the hooks raised and in a safe position as bait is placed in the trap.

A further object of the present invention is to provide a rat trap of the aforementioned character including curtains for concealing the hooks so that rats or mice will not be warned of the contents of the trap until after the animals have entered the trap.

A still further aim of the present invention is to provide a trap for rats, mice and the like that is simple and practical in construction, strong and reliable in use, small and compact in structure, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present trap;

Figure 2 is a longitudinal vertical sectional view taken substantially on the plane of section line 2—2 of Figure 1;

Figure 3 is a transverse vertical sectional view taken substantially on the plane of section line 3—3 of Figure 2; and, Figure 4 is a diagrammatic view of the electric means used in the present invention.

Referring now to the drawings in detail, wherein for the purpose of illustration, there is disclosed a preferred embodiment of the present invention, the numeral 10 represents the trap generally, composed of a pair of spaced side walls 12 and 14 of non-conducting material, such as wood, the upper portions of which are joined by an upper pair of end strips 16 and 18, and an upper intermediate strip 20.

Each of the strips 16 and 18 supports a plurality of depending eye members 22 that pivotally support the upper ends 24 of sharp hooks 26. The central or intermediate strip 20 is provided with a bait supporting means or hanger eye 28.

A curtain or flexible concealing strip 30 is secured to the outer edge of each end strip and depends below the hooks so that the hooks will not be visible to an animal from outside the trap.

A lower pair of end conductive strips 32 and 34 are suitably secured to and join the lower portions of the side walls and form the bottom wall or base of the trap along with a lower intermediate conductive strip 36 that is suitably secured to and which joins and strengthens the side walls. The strips 32, 34 and 36 underlie the respective strips 16, 18 and 20 as shown in Figure 2 of the drawings.

The strips 32 and 34 are connected by conductors C to one wire of an electric cord whereas the strip 36 is connected by a conductor C, to the other wire of an electric cord. The electric cord is applied to a suitable source of electric current sufficient to shock an animal simultaneously contacting the strip 36 and one of the strips 32 or 34.

In practical use of the present invention an animal entering the trap from either end thereof and attempting to reach the bait B will contact the strip 36 and one of the strips 32 or 34 and will receive a shock which will cause the animal to jump and become impaled by at least one of the hooks.

Although it is intended that the shock not be sufficient to electrocute the animal, it is anticipated that a larger current may be directed to the strips 32, 34 and 36 for electrocuting the rats or mice if such is found desirable.

Means is provided for raising the hooks on one or both of the strips 16 and 18 whereby bait may be applied to the means 28 in a convenient and safe manner. This raising means consists of a rod 38 rotatably and slidably supported in apertures beneath the strip 16 and having a longitudinal offset 40 for riding against the hooks on the strip 16 as the rod or shaft 38 is manually rotated by a lateral projection 42 at one end of the rod.

As the rod is rotated, the hooks on the strip 16 may be swung upwardly toward the strip 16. Then, the rod 38 is pulled toward the operator to place the projection 42 on a ledge or abutment 44 on the side wall 12 and thereby retain the hooks in a safe position as bait is applied to the means 28.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A trap for rats, mice and the like comprising a pair of spaced substantially vertical side walls, upper strips joining said side walls including end strips and an intermediate strip, bait supporting means depending from the intermediate strip, hooks swingably mounted on and depending from the end strips, means carried by the end strips concealing the hooks, a pair of end conductive strips joining the side walls and underlying the upper end strips, an intermediate conductive strip also joining said side walls, said conductive strips being connected to a source of electric current whereby a rat simultaneously contacting one of said end conductive strips and said intermediate conductive strip will receive a shock, and said hooks being located sufficiently close to said hooks to impale a rat jumping in response to a shock received when contacting one of said end conductive strips and said intermediate conductive strip.

LESLIE R. EDWARDS.

REFERENCES CITED

The following references are of record in the file of this patent:

UNITED STATES PATENTS

| Number | Name | Date |
| --- | --- | --- |
| 909,814 | Norris | Jan. 12, 1909 |
| 983,934 | Runion | Feb. 14, 1911 |
| 1,062,126 | Smith | May 20, 1913 |

FOREIGN PATENTS

| Number | Country | Date |
| --- | --- | --- |
| 85,344 | Switzerland | of 1920 |
| 395,961 | Great Britain | of 1933 |